United States Patent [19]

Lee et al.

[11] 4,036,178

[45] July 19, 1977

[54] ELECTRONIC LOCK AND KEY SYSTEM

[76] Inventors: Barry Thomas Lee, 22715 Clarendon St., Canoga Park, Calif. 91364; Gilbert Peter Hyatt, 11101 Amigo Ave., Northridge, Calif. 91324

[21] Appl. No.: 583,136

[22] Filed: June 2, 1975

Related U.S. Application Data

[63] Continuation-in-part of Ser. No. 438,328, Jan. 31, 1974, Pat. No. 3,897,753.

[51] Int. Cl.² ............................................... A01K 5/02
[52] U.S. Cl. .................................... 119/51 R; 119/29
[58] Field of Search ................................ 119/51 R, 29

[56] References Cited

U.S. PATENT DOCUMENTS

| 3,465,724 | 9/1969 | Broadbent | 119/51 R |
| 3,541,995 | 11/1970 | Fathauer | 119/51 R |
| 3,753,421 | 8/1973 | Peck | 119/29 |
| 3,844,273 | 10/1974 | Polson | 119/51 R |

Primary Examiner—Hugh R. Chamblee
Attorney, Agent, or Firm—Gilbert P. Hyatt

[57] ABSTRACT

An electronic lock and key system is provided for controlling access. A passive key provides selective access without having a self contained power source. In a passive transponder arrangement, a passive electronic key processes induced or radiated electronic signals to generate a transponder signal for controlling access.

33 Claims, 11 Drawing Figures

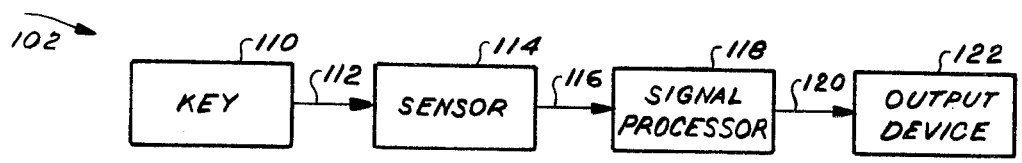
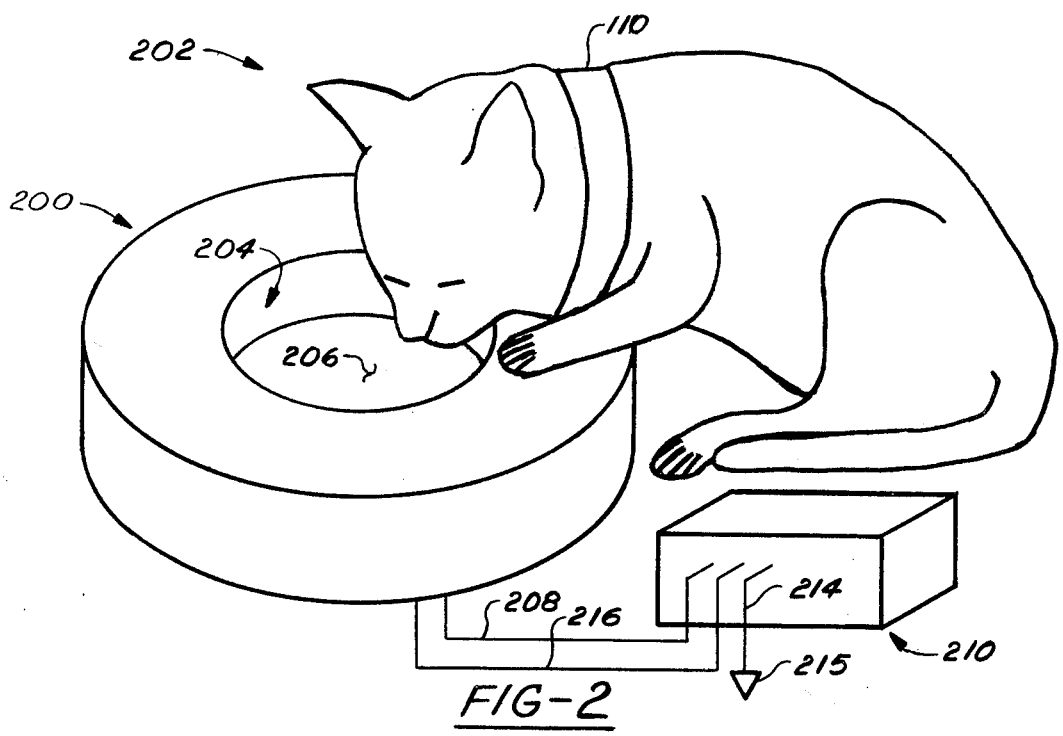
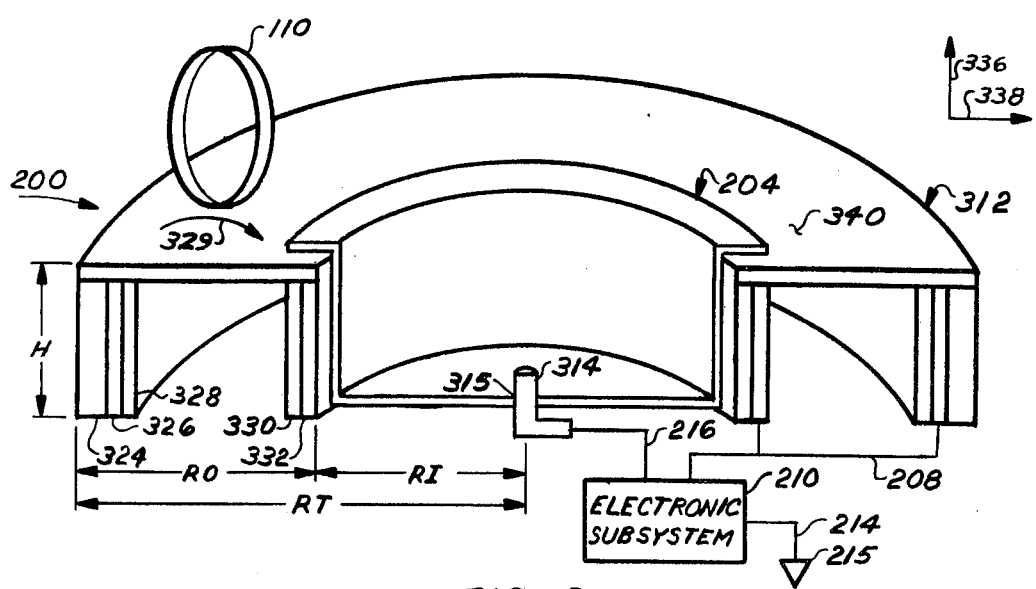

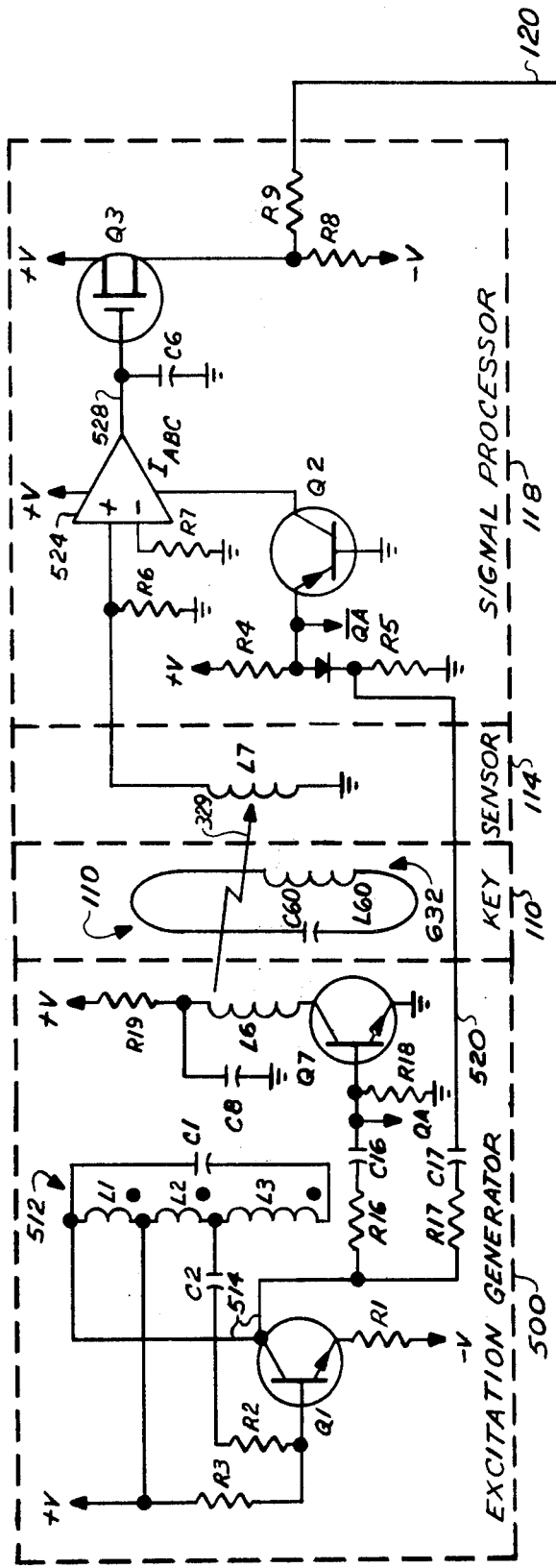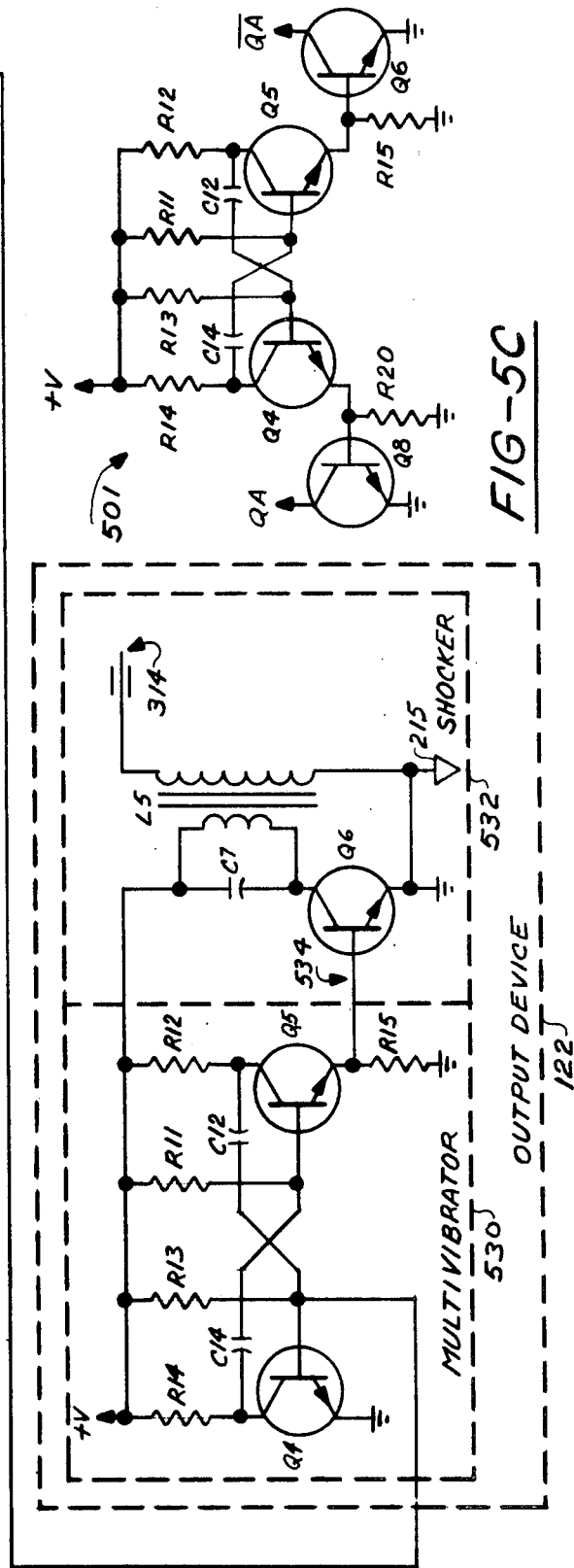
FIG-5C

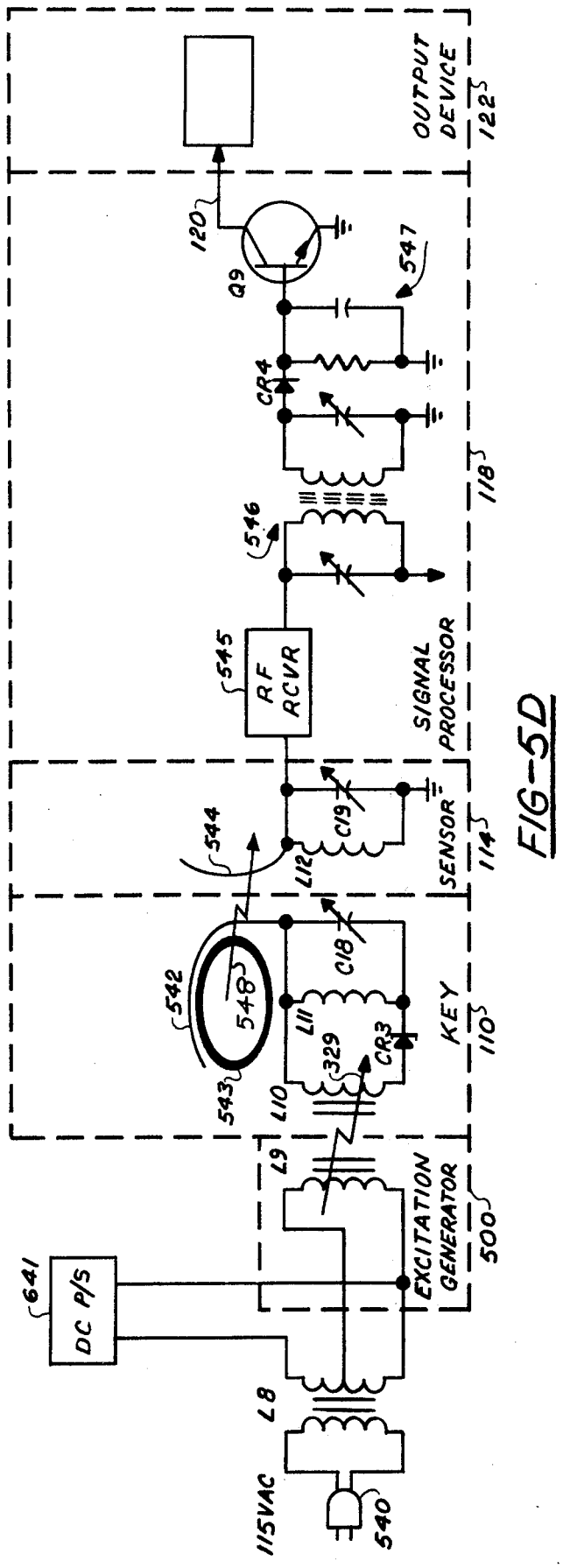

ELECTRONIC LOCK AND KEY SYSTEM

CROSS REFERENCE TO RELATED APPLICATIONS

This application is a continuation-in-part of copending application MEANS AND METHOD FOR SELECTIVELY CONTROLLING ANIMALS, Ser. No. 438,328 filed on Jan. 31, 1974 by Barry T. Lee and Gilbert P. Hyatt and now U.S. Pat. No. 3,897,753 issued on Aug. 5, 1975, wherein this copending application is incorporated herein by reference as fully set forth at length herein.

BACKGROUND OF THE INVENTION

1. Field of the Invention

This invention relates to access control in general and particularly to access control for animals on a selective basis.

2. Description of the Prior Art

The prior art is described in U.S. Pat. No. 3,897,753 at column 1 lines 26 to 52; which description is incorporated herein by reference.

The prior art is well defined in the art-of-record of the parent patent application; being prior art U.S. Pat. Nos. 3,465,724 to Broadbent; 3,541,995 to Fathauer; 3,557,757 to Brooks; 3,516,575 to Moffitt; 3,180,321 to Aldinger; 3,557,758 to Lack; and 3,753,421 to Peck; wherein these prior art patents are incorporated herein by reference.

SUMMARY OF THE INVENTION

The present invention provides an improved system for controlling access. In particular control of access for animals on a selective basis is provided.

In one embodiment of the present invention, animals that are to be selectively controlled are identified with a collar or other identifying device. Sensing of the identifying device and controlling an output device in response thereto is provided. In a preferred embodiment, only a simple passive device need be carried by the animal, where the complex circuitry that consumes power need not be carried by the animal.

In one embodiment, a collar is provided with a conductor such as a wire embedded therein for changing an electric field associated with a field source and sensor arrangement. Monitoring of the electric field with a sensor provides a sensor signal related to the electric field which is processed with signal processors and used to control an output device. Other sensor arrangements may use color detectors, illumination detectors, sound detectors, weight detectors, and other detectors that are responsive to the characteristics of an animal or a device contained therewith. In one embodiment, output devices may be repelling devices such as shockers, noise makers, light flashers, and other such arrangements that may repel an animal. In another embodiment, output devices may be actuators for unlocking doors and gates, for opening doors and gates, for dispensing food or drink, and for providing other electro-mechanical operations. In still another embodiment, output devices may be recording devices to indicate the number of animals sensed, the type of animals sensed, or for recording other sensed characteristics.

An object of the present invention is to provide an animal control arrangement.

A further object of the present invention is to provide an animal sensing arrangement.

A still further object of the present invention is to provide an output arrangement for controlling animals.

Still another object of the present invention is to provide a system for selectively feeding animals.

Yet another object of the present invention is to provide a training device to train animals.

A still further object of the present invention is to provide an access arrangement such as with an electronic lock and key.

Yet another object of the present invention is to provide a passive animal borne identification device that does not require self contained excitation.

Still another object of the present invention is to provide an improved physical design of an animal feeder arrangement.

Yet still another object of the present invention is to provide an improved phase sensitive detector arrangement.

The forgoing and other objects, features, and advantages of this invention will become apparent from the following detailed description of preferred embodiments of this invention, as illustrated in the accompanying drawings.

BRIEF DESCRIPTION OF THE DRAWINGS

A better understanding of the invention may be had from a consideration of the detailed description hereinafter taken in conjunction with the drawings described below.

FIG. 1 is a block diagram of a key controlled system in accordance with the present invention.

FIG. 2 illustrates the use of a cat feeder arrangement in accordance with the present invention.

FIG. 3 illustrates a cross-sectioned view of the feeder arrangement shown in FIG. 2.

FIG. 4, comprising FIGS. 4A and 4B, illustrates alternate embodiments of the key controlled system in accordance with the present invention; wherein FIG. 4A illustrates a key controlled food dispenser and FIG. 4B illustrates a key controlled access door.

FIG. 5, comprising FIGS. 5A-5D, illustrates preferred embodiments of the present invention; wherein FIG. 5A illustrates a block diagram of the preferred embodiment and FIGS. 5B-5D illustrate detailed schematic representations of a shorted turn embodiment, a time-division passive transponder embodiment, and a frequency-division passive transponder embodiment respectively in accordance with the block diagram of FIG. 5A.

FIG. 6, comprising FIGS. 6A and 6B, illustrates alternate embodiments of a key device; wherein FIG. 6A illustrates physical construction of a collar key and FIG. 6B illustrates a schematic representation of an even more selective key device in accordance with the present invention. FIGS. 1 to 4, 5A, 5B, and 6 are described in detail in U.S. Pat. No. 3,897,753 at column 3 line 24 to column 16 line 45; which descriptions are incorporated herein by reference.

Figure 4A:
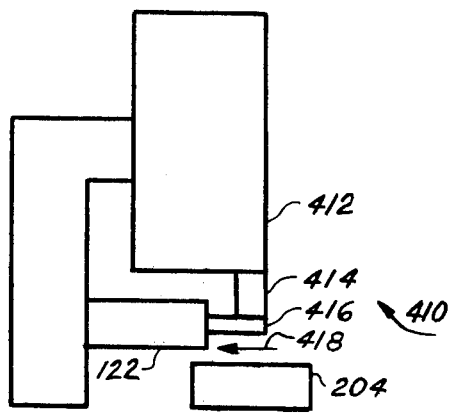
Figure 4B:
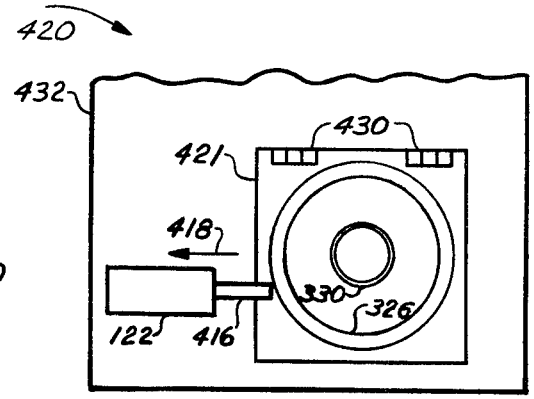

By way of introduction of the illustrated embodiment, the components shown in FIGS. 1 through 6 of the drawings have been assigned general reference numerals and a brief description of such components is given in the following description. The components in each figure have in general been assigned three digit reference numerals wherein the hundreds digit of the reference numerals corresponds to the figure number. For example, the components in FIG. 1 have reference numerals inbetween 100 and 199 and the components in FIG. 2 have reference numerals inbetween 200 and 299 except that the same component appearing in successive drawing figures has maintained the first reference numeral.

DETAILED DESCRIPTION

A detailed description of the present invention is provided in U.S. Pat. No. 3,897,753 at column 3 line 24 to column 5 line 6; which description is incorporated herein by reference.

Mechanical Configuration

A description of the Mechanical Configuration of the present invention is provided in U.S. Pat. No. 3,897,753 at column 5 line 9 to column 7 line 67; which description is incorporated herein by reference.

A preferred embodiment of the present invention may use electronic circuits implemented in monolithic integrated circuit form. In particular, the small size and low power dissipation of integrated circuits provide advantages for implementation of the key device, wherein the key device may be a portable device and may be a passive device, and wherein small size and low power dissipation that are now available with monolithic integrated circuits provides particular advantages. For example, key device 110 (FIG. 5D) is shown implemented with discrete components, wherein these discrete components may be replaced with well known integrated circuit implementations. For example, the tunnel diode oscillator is shown using coil L11 and capacitator C18 in conjunction with tunnel diode CR3, wherein reactive components such as coils and capacitors are not readily reducible to monolithic integrated circuit form. Therefore, an alternate oscillator arrangement may be provided that is implementable in monolithic integrated circuit form where well known integrated circuit oscillators are characterized by S/N CA3123E and S/N CD4046AD integrated circuit oscillators manufactured by RCA. Further, low power dissipation circuitry such as CMOS integrated circuit components may be used to provide lower power dissipation circuitry.

Electronic Subsystem

A description of the Electronic Subsystem of the present invention is provided in U.S. Pat. No. 3,897,753 at column 8 line 3 to column 11 line 47; which description is incorporated herein by reference.

Passive Transponder Embodiment

An alternate embodiment of the system of the present invention is implemented in the form of a passive transponder. A transponder is a device that generates a transponder signal or return signal in response to an interrogating signal. The transponder signal may have a characteristic different from the interrogating signal to facilitate separation and detection thereof. A passive characteristic of the transponder permits it to operate independent of a self-contained power source. A transponder may be characterized by a device that generates a reply signal in response to an interrogating signal. A passive key device may be characterized as a device that does not have a self-contained power supply and may operate on or modify the energy transmitted thereto or induced therein. A passive transponder may be powered by an interrogating signal to generate a transponder signal or may modify the interrogating signal to constitute the transponder signal. Two embodiments of passive transponder arrangements will now be described to exemplify this generalized inventive feature.

A first passive transponder embodiment will be described hereinafter with reference to FIG. 5C. A pulse excitation signal induces resonance in a key device, wherein resonance of the key device continues after the excitation signal is discontinued thereby providing a time related difference therebetween for detection. In this first passive transponder embodiment, the key device has a passive characteristic wherein excitation pulse energy initiates resonant oscillations of the key device and wherein the stored resonant energy continues to generate a field signal after the excitation pulse has ceased, thereby storing and regenerating excitation energy and precluding the need for a self-contained energy source with the key device.

A second passive transponder embodiment will be described hereinafter with reference to FIG. 5D. An excitation circuit provides an excitation field which is inductively coupled to a key device to power a self-contained oscillator, wherein the oscillator signal may be detected with a receiver as indicative of close proximity between the key device and the excitation field. In this second passive transponder embodiment, the excitation field provides energy to initiate and sustain oscillations of the oscillator in the key device thereby providing energy to power a passive key device.

Other passive transponders may be energized with excitation energy for generating a transponder signal to a receiver or sensor device, wherein the transponder signal may have a characteristic different from the excitation energy such as having a different frequency, a different phase, a different time, a different amplitude, a different code, a different signature, or other different characteristics relative to the excitation energy to permit separation therebetween. Still other passive transponder arrangements will now become obvious to those of ordinary skill in the art from the teachings of the present invention.

Figure 5A:
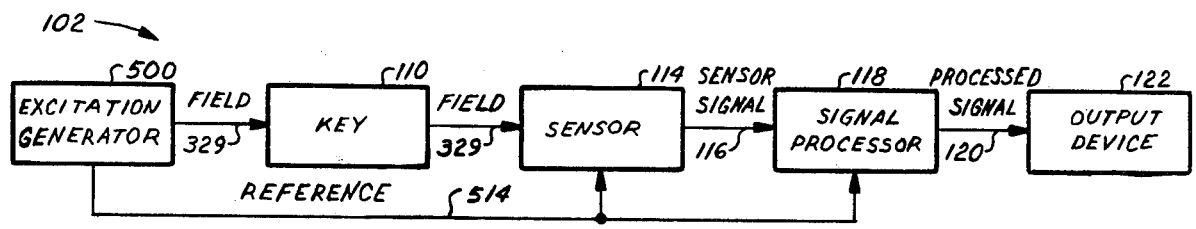

A first passive transponder embodiment will now be described with reference to FIG. 5C, which is consistant with the block diagram discussed above with reference to FIG. 5A and the arrangement discussed above with reference to FIG. 5B. Most of the circuitry shown in FIG. 5C is the same as the circuitry discussed above with reference to FIG. 5B and therefore need not be discussed again, wherein descriptions of the common circuitry provided for FIG. 5B is equally applicable to FIG. 5C.

Figure 5B:
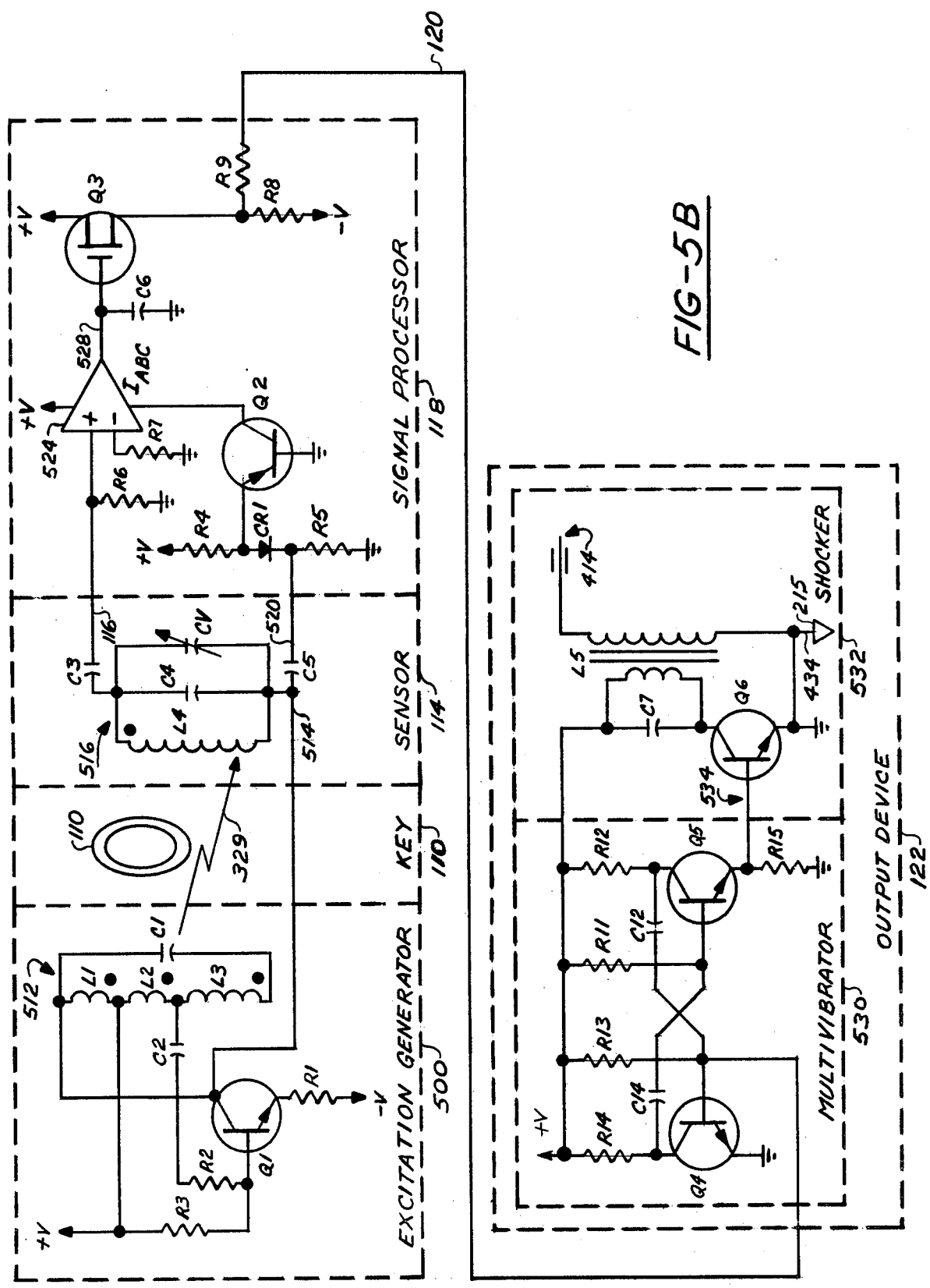

Excitation generator 500 consists of an oscillator generating oscillator signal 514 at the collector of transistor Q1, as discussed with reference to FIG. 5B above. Oscillator signal 514 is coupled through resistor R16 and capacitor C16 to output transistor Q7 and through resistor R17 and capacitor C17 to demodulator transistor Q2. Transistor Q7 drives coil L6 to provide electric field 329. Load resistor R19 provides current limiting and capacitor C8 provides an AC ground and DC isolation for the collector circuit of transistor Q7. Resistor R18 provides base circuit biasing for transistor Q7. Input signal QA enables transistor Q7 to excite field coil L6 with oscillator signal 514 when signal QA has an open circuit or high impedance characteristic and disables transistor Q7 to non-excite field coil L6 when signal QA has a low impedance and low voltage characteristic such as being connected near ground. Therefore, signal QA may be used to control field 329 from coil L6 to be energized or de-energized.

Figure 6A:
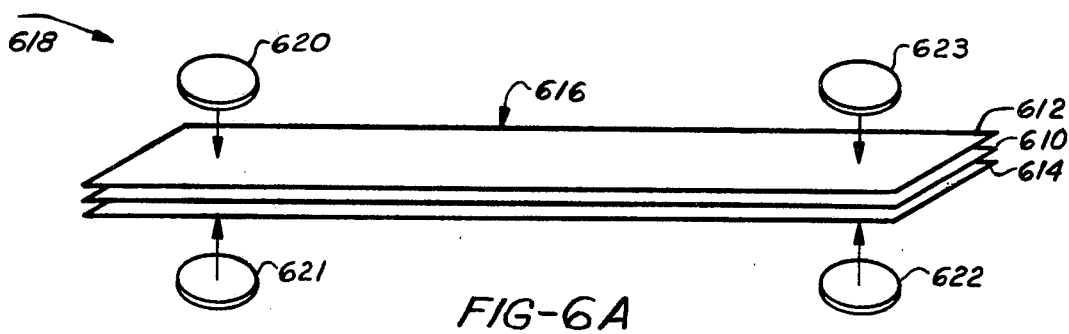
Figure 6B:
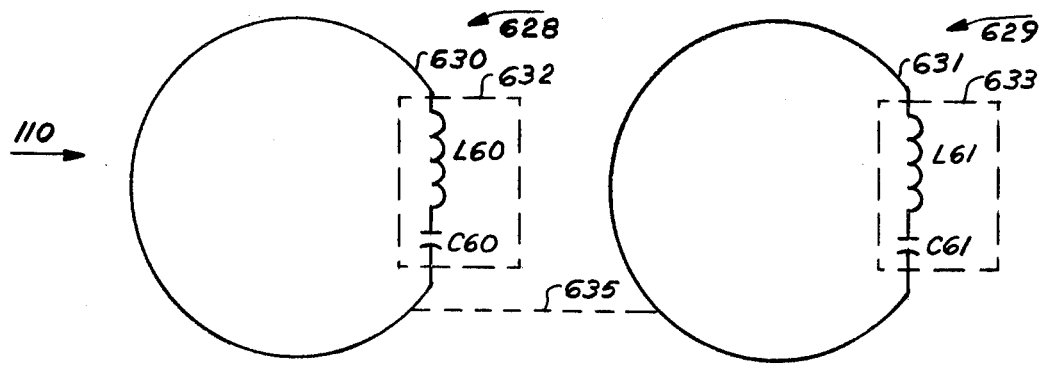

Key device 110 is shown as a closed loop having resonant circuit 632 with capacitor C60 and inductor L60, as further described with reference to FIG. 6B hereinafter. Resonant circuit 632 may be tuned to resonate at the excitation frequency of oscillator 512 and therefore the oscillator related field 329. Therefore, resonant circuit 632 may store oscillatory energy from field 329.

Sensor 114 consists of coil L7 for receiving oscillatory energy 329 from coil L6 and from resonant circuit 632 as composite field signal 329. The received signal from coil L7 is demodulated with amplifier 524 under control of transistor Q2 operating in response to oscillator signal 520 to generate output signal 120 through FET Q3. The operation of signal processor 118 has been described with reference to FIG. 5B above. Signal $\overline{QA}$ at the input to transistor Q2 may be used to control the responsiveness of signal processor 118 to the signal from coil L7. For example, when signal $\overline{QA}$ has a high impedance characteristic, signal processor 118 operates as discussed with reference to FIG. 5B above generating output signal 120 in response to a received signal from coil L7. When signal $\overline{QA}$ has a low impedance and low voltage characteristic such as being connected near ground, transistor Q2 is reverse biased. When signal $\overline{QA}$ reverse biases transistor Q2, excitation signal 520 will not be able to make transistor Q2 conductive thereby causing amplifier 524 to turn-off FET Q3 with signal 528 to disable output signal 120. Output signal 120 controls output device 122, which may include a multivibrator 530 and a shocker 532 as discussed above with reference to FIG. 5B.

In the circuit described with reference to FIG. 5C, coil L7 may receive field signal 329 from coil L6 independent of the presence of key device 110; where the field component from coil L6 may even obscure the field component from resonant circuit 632 when a key device is present. The oscillatory signal from resonant circuit 632 may be superimposed on the excitation signal from coil L6 when detected with sensor 114, wherein phase sensitive demodulator 524 in signal processor 118 may not be able to detect the component of field signal 329 from resonant circuit 632 superimposed on and possibly obscured by the component of field signal 329 from coil L6. Therefore, it is desirable if not necessary to separate the passive transponder signal from the excitation signal. A time-division multiplexing separation method has been selected to exemplify this inventive feature, wherein sensing of the resonant signal from resonant circuit 632 may be provided when the excitation signal from coil L6 is disabled. Further, phase sensitive demodulator 524 may also provide separation based upon phase and/or amplitude characteristics introduced by resonant circuit 632.

In a time-division separation arrangement, excitation generator 500 may be controlled to interrogate key 110 for a period of time that is controlled with signal QA and signal processor 118 may be controlled to sense resonance oscillation from circuit 632 after excitation generator 500 is disabled under control of enabling signal $\overline{QA}$. A control multivibrator 501 generates the QA and $\overline{QA}$ control signals as complement control signals, wherein signal QA has a high impedance characteristic when signal $\overline{QA}$ has a low impedance characteristic and conversely. Multivibrator 501 is implemented similar to multivibrator 530 and has the same component designations for corresponding components, consistent with the above description for operation of multivibrator circuit 530. Briefly, transistor Q4 is turned-on and transistor Q5 is turned-off for a first controlled period of time. Next, transistor Q5 is turned-on and transistor Q4 is turned-off for a second controlled period of time. Transistors Q4 and Q5 drive transistors Q8 and Q6 respectively in a well known emitter follower configuration with emitter load resistors R20 and R15 respectively. Therefore, transistor Q8 is turned-on when transistor Q4 is turned-on and transistor Q8 is turned-off when transistor Q4 is turned-off. Similarly, transistor Q6 is turned-on when transistor Q5 is turned-on and transistor Q6 is turned-off when transistor Q5 is turned-off. Therefore, transistor Q8 will be turned-on for the period of time that transistor Q6 is turned-off and transistor Q6 will be turned-on for the period of time that transistor Q8 is turned-off. The QA signal from transistor Q8 and the $\overline{QA}$ signal from transistor Q6 are complement or out-of-phase signals wherein signal QA is connected near ground through conducting transistor Q8 providing a low impedance path to ground when signal $\overline{QA}$ is substantially open through non-conducting transistor Q6 and alternately signal $\overline{QA}$ is connected near ground through conducting transistor Q6 providing a low impedance path to ground when signal QA is substantially open through non-conducting transistor Q8. Transistor Q8 is connected to "pull-down" the base of transistor Q7 in excitation generator 500 when signal $\overline{QA}$ enables demodulator 524 through transistor Q2 and, conversely, signal QA enables excitation generator 500 by not pulling-down the base of transistor Q7 when signal $\overline{QA}$ pulls-down the emitter of transistor Q2 to disable phase sensitive demodulator operation.

Control multivibrator 501 alternately selects (1) generation of excitation and (2) sensing of resonance. Signal processor 118 and output device 122 are disabled when excitation generator 500 is enabled to generate field 329 to preclude enabling of output device 122 in response to the excitation generator signal and signal processor 118 and output device 122 are enabled when excitation generator 500 is disabled to permit signal processor 118 to detect resonance of key device 110. This is accomplished by enabling excitation generator 500 with control signal QA and simultaneously disabling signal processor 118 with control signal $\overline{QA}$ or by disabling excitation generator 500 with control signal QA and enabling signal processor 118 with control signal $\overline{QA}$. Therefore, excitation generator 500 excites resonant circuit 632 of key device 110 when a key device is in the proximity of excitation generator 500, then excitation generator 500 is disabled with control signal QA and signal processor 118 is enabled with control signal $\overline{QA}$ to permit signal processor 118 to sense resonant signal 329 from resonant circuit 632 after excitation from excitation generator 500 has been discontinued. If a key device 110 is not in the proximity of the system, energy from excitation generator 500 will not be stored and therefore, when excitation generator 500 is disabled with signal QA and signal processor 118 is enabled with signal $\overline{QA}$, there will not be any stored field energy to be sensed with signal processor 118 and therefore output device 122 will be disabled with signal 120. When a key device 110 is located in the proximity of the system, excitation generator 500 being enabled with control signal QA will excite key device 110 which will store excitation energy and, when excitation generator 500 is disabled with signal QA and signal processor 118 is enabled with signal $\overline{QA}$, signal processor 118 will sense stored resonant energy from key device 110 to disable output device 122 with signal 120.

Oscillator 512 in excitation generator 500 provides continuous oscillation, wherein control signal QA controls the outputting of oscillation signal 514 to coil L6 with transistor Q7 but control signal QA does not control oscillation of oscillator 512. Therefore, reference signal 520 is continuously available to signal processor 118.

A second passive transponder embodiment will now be discussed with reference to FIG. 5D, which is consistent with the block diagram discussed above with reference to FIG. 5A. AC power may be received from a well known AC wall socket with AC plug 540 for exciting transformer L8. A DC power supply 641 may be provided for generating DC power such as +V and −V power shown in FIGS. 5B and 5C above and for generating DC power required for excitation generator 500, signal processor 118, and output device 122 of FIG. 5D. An excitation transformer L9 may be provided for generating excitation field 329 related to the 60-cycle AC power from transformer L8.

A key device 110 may be implemented with an input winding L10 for receiving excitation signal 329 to power an oscillator such as a tunnel diode oscillator shown in FIG. 5D. Resonant circuits comprising coil L11 and variable capacitor C18 may be connected to tunnel diode CR3 in the form of a well known tunnel diode oscillator. Oscillatory signals from the resonant circuit may be connected to antenna wire 542 for providing a field having a frequency related to the frequency of the tunnel diode oscillator. This oscillator frequency is significantly higher than the 60-cycle excitation frequency, wherein the frequency of the tunnel diode oscillator may be in the region of well known AM radio receivers such as 100 KHz. A mounting device shown as collar 543 may be provided wherein the electronic circuit of the key device comprising components L10, L11, C18, and CR3 may be housed in a small module and mounted from collar 543. Also, antenna 542 may be distributed around collar 543.

Sensor 114 may include an antenna comprising antenna line 544 and a tuned circuit comprising coil L12 and variable capacitor C19. The receiver tuned circuit (L12 and C19) may be tuned to the frequency of the transmitter tuned circuit (L11 and C18) to maximize the signal received with sensor 114.

Signal processor 118 may include a well known radio frequency (RF) receiver 545 and a well known output IF transformer 546 which is commonly used in conjunction with RF receiver 545. Detector diode CR4 rectifies the signal from RF transformer 546 and filter 547 filters the rectified or detected IF transformer signal to control transistor Q9. Transistor Q9 is turned-on to be conductive in response to the presence of a received signal from diode CR4 and is turned-off to be non-conductive in response to the absence of a received signal from diode CR4, wherein the presence or absence of a key device 110 is detected or non-detected with signal processor 118 to control output device 122 similar to the arrangement discussed with reference to FIGS. 5B and 5C above.

Signal processor components such as sensor 114, RF receiver 545, IF transformer 546, and detector CR4 are well known in the radio art. Most AM radios use superhetrodyne circuits having an antenna 544 shown in sensor 114, RF receiver circuitry 545, output IF transformer 546, and detector CR4. A well known RF receiver 545 may include an RF amplifier for amplifying the signal from antenna 114, a local oscillator for generating a local oscillator signal, a mixer for generating an IF signal by mixing the RF signal and the local oscillator signal, an IF amplifier for providing an IF signal to IF transformer 546 and a detector CR4 and filter 547 generating a filtered detected signal.

The arrangement shown in FIG. 5D provides an AC excitation field 329 which may be a 60-cycle field and a tunnel diode oscillator field 548 which may be an RF field in the frequency band of approximately 100-KHz. Sensor 114 and signal processor 118 may be sensitive to RF signals and may be tuned to the frequency of key device 110, but sensor 114 and signal processor 118 may be insensitive to the AC excitation field from excitation generator 500. Therefore, signal processor 118 may enable output device 122 in response to the presence of key device 110 and signal processor 118 may disable output device 122 in response to the absence of key device 110, thereby providing selective control.

The passive transponder arrangements of FIGS. 5C and 5D may be selectively responsive to a particular key device and may be selectively non-responsive to other key devices. For example, the arrangement shown in FIG. 5C may be responsive to a key device having a resonant frequency related to the frequency of excitation generator 500 and may be non-responsive to key devices having resonant frequencies different from the frequency of excitation generator 500. Similarly, the sensor 114 and signal processor 118 of FIG. 5D may be responsive to a particular RF frequency related to the tuned frequency of sensor 114 and the local oscillator and IF frequencies of RF receiver 545, wherein a key device oscillator frequency set by coil L11 and capacitor C18 may be the same as the tuned frequency of sensor 114 and receiver 545 for proper detection of a selected key device and may be different from the tuned frequency of sensor 114 and receiver 545 for non-detection of a non-selective key device. Selective detection of different key devices is further discussed with reference to FIG. 6B hereinafter. Further, a plurality of frequency generation and frequency sensitive devices may be used in combination to provide a multiple signal coded detector as discussed herein with reference to multi-element key locks and combination locks.

Collar

An important feature of the present invention is the key device, where a preferred embodiment of the key device has been found to be inexpensive to manufacture, passive in nature, and to eliminate the need for self-contained electrical excitation. For example, in a preferred embodiment the key device is merely a conductive loop integrated into a collar for an animal. This conductive loop may be a wire or metal foil embedded in the collar, a conductive collar material such as a graphite impregnated material, or other such arrangements. In another embodiment, the collar may be a woven material having an expandable characteristic like well known expandable woven fabrics and including conductive strands such as copper wires interwoven in the expandable pattern. Such materials are characterized by knitted wire meshes provided by ACS Industries, Inc. of Woonsocket, R.I.

A description of the Collar of the present invention is provided in U.S. Pat. No. 3,897,753 at column 11 line 65 to column 12 line 64; which description is incorporated herein by reference.

Multi-Element Key

A description of the Multi-Element Key of the present invention is provided in U.S. Pat. No. 3,897,753 at column 12 line 66 to column 14 line 20; which description is incorporated herein by reference.

Alternate Embodiments

A description of Alternate Embodiments of the present invention is provided in U.S. Pat. No. 3,897,753 at column 14 line 23 to column 16 line 45; which description is incorporated herein by reference.

In yet another embodiment, the system of the present invention may be used for controlling human beings. For example, excitation generator 500, sensor 114 and signal generator 118 may be located near a door-way or entrance-way for unlocking or locking a door in response to detection or non-detection respectively of key device 110 (FIG. 5A). Further, oscillator coil L6 (FIGS. 5B and 5C) or power coil L9 (FIG. 5D) may be mounted around an entrance-way such as imbedded in walls of an entrance-way so that a person desiring access would pass through the coil to gain access, where possession of a proper key device 110 would permit access such as by unlocking or unbolting a door. Still further detection of a person or animal such as by a weight-sensitive sensor on a floor in conjunction with non-detection of an appropriate key device may be used to sound an alarm as being indicative of the presence of an improper person or animal.

Scope

A description of the Scope of the present invention is provided in U.S. Pat. No. 3,897,753 at column 16 line 48 to column 17 line 51; which description is incorporated herein by reference.

The term animal and terms pertaining thereto are intended to include all types of animals including land animals, airborne animals, and sea animals and further including human beings.

Considerations

The invention disclosed herein is presented in a preferred embodiment to exemplify the inventive features, but the scope of this invention is much broader than illustrated with preferred embodiment. Therefore, the scope is intended to be broadly interpreted to cover the general fields of selective control, access control, and locks and keys.

Various publications may be used for providing background for this invention and for illustrating the prior art. The various subject areas and associated references for each subject area are listed below.
1. Hurley, Richard B.; JUNCTION TRANSISTOR ELECTRONICS: John Wiley and Sons, Inc. (1958) and
2. Fitchen, Franklin C.; TRANSISTOR CIRCUIT ANALYSIS AND DESIGN; D. Van Nostrand Co. Inc. (1960) and
3. Ramo and Whinnery; FIELDS AND WAVES IN MODERN RADIO; John Wiley and Sons, Inc. (1956)

These publications and the publications referenced therein provide non-essential subject matter and are incorporated herein by reference.

Various elements of the present invention have been described separately herein for simplicity. In a preferred embodiment, various elements of the present invention may be used in combination to provide the combined advantages of the individual elements. These combinations will become obvious to those skilled in the art from the teachings of this invention.

From the above description it will be apparent that there is thus provided a device of the character described possessing the particular features of advantage before enumerated as desireable, but which obviously is susceptible to modification in its form, method, mechanization, operation, detailed construction and arrangement of parts without departing from the principles involved or sacrificing any of its advantages.

While in order to comply with the statute, the invention has been described in language more or less specific as to structural features, it is to be understood that the invention is not limited to the specific features shown, but that the means, method, and construction herein disclosed comprise the preferred form of several modes of putting the invention into effect, and the invention is, therefore, claimed in any of its forms or modifications within the legitimate and valid scope of the appended claims.

What we claim is:
1. A control system comprising:
   excitation means for generating an excitation signal;
   identification means for generating an identification signal in response to the excitation signal, said identification means including at least one monolithic integrated circuit;
   sensor means for generating a sensor signal in response to the identification signal; and
   control means for providing control in response to the sensor signal.
2. The system as set forth in claim 1 above further comprising means for mounting said identification means on an animal.
3. The system as set forth in claim 1 above wherein said identification means includes passive transponder means for generating the identification signal in response to the excitation signal.
4. The system as set forth in claim 1 above wherein said integrated circuit is a CMOS integrated circuit.
5. The system as set forth in claim 1 above wherein said identification means includes means for generating a time division identification signal and wherein said sensor means includes means for processing the time division identification signal to generate the sensor signal.
6. The system as set forth in claim 1 above wherein said excitation means includes means for generating the excitation signal at a first time, wherein said identification means includes means for generating the identification signal at a second time, and wherein at least a portion of the identification signal is not coincident with the excitation signal.
7. The system as set forth in claim 1 above wherein the excitation signal and the identification signal are frequency division multiplexed signals.
8. The system as set forth in claim 1 above wherein the excitation signal and the identification signal are time division multiplexed signals.
9. The system as set forth in claim 1 above wherein said system is an electronic lock and key system for controlling access of a human.
10. The system as set forth in claim 9 above wherein said control means includes means for controlling a door lock.

11. The system as set forth in claim 9 above wherein said identification means is arranged as an electronic key for a human.

12. An electronic lock and key system comprising:
  interrogating means for generating an interrogating signal;
  passive key means for generating a transponder signal in response to the interrogating signal;
  sensor means for generating a sensor signal in response to the transponder signal;
  signal processing means for generating a lock control signal in response to the sensor signal; and
  lock control means for controlling a lock in response to the lock control signal.

13. The system as set forth in claim 12 above wherein said interrogating means includes means for generating an oscillatory interrogating signal, wherein said passive key means includes means for storing the oscillatory signal and means for generating an oscillatory transponder signal in response to the stored interrogating signal, and wherein said sensor means includes means for generating the sensor signal in response to the oscillatory transponder signal.

14. The system as set forth in claim 12 above wherein said signal processor means includes means for detecting the transponder signal in response to a phase related characteristic thereof.

15. The system as set forth in claim 12 above wherein said signal processing means includes means for detecting the transponder signal in response to a time related characteristic thereof.

16. The system as set forth in claim 12 above wherein said signal processing means includes means for detecting the transponder signal in response to a frequency related characteristic thereof.

17. The system as set forth in claim 12 above wherein said signal processing means includes phase sensitive means for generating the lock control signal in response to a phase related characteristic of the sensor signal.

18. The system as set forth in claim 12 above wherein said passive key means includes means for mounting on an animal and wherein said output means includes means for controlling an animal.

19. The system as set forth in claim 12 above wherein said passive key means includes means for storing the interrogating signal and means for generating the transponder signal in response to the stored interrogating signal.

20. The system as set forth in claim 19 above wherein said interrogating signal generating means includes an electronic oscillator circuit, wherein said oscillatory signal storing means includes a transponder tuned circuit, and wherein said sensor means includes a sensor tuned circuit.

21. The system as set forth in claim 20 above wherein said transponder tuned circuit includes transponder tuning means being tuned to the frequency of the oscillatory interrogating signal and wherein said sensor tuned circuit includes sensor tuning means being tuned to the frequency of the oscillatory interrogating signal.

22. The system as set forth in claim 12 above wherein said interrogating means includes means for generating an oscillatory interrogating signal having a first frequency, wherein said passive key means includes oscillator means for generating an oscillatory transponder signal having a second frequency in response to the interrogating signal, and wherein the first frequency is different from the second frequency.

23. The system as set forth in claim 22 above wherein said first frequency is less than one thousand hertz and wherein said second frequency is greater than one thousand hertz.

24. The system as set forth in claim 22 above wherein said first frequency is equal to the frequency of a 60 hertz power signal and wherein said second frequency is greater than one thousand hertz.

25. The system as set forth in claim 24 above wherein said second frequency is a radio frequency.

26. A door control system comprising:
  excitation means for generating an excitation signal;
  key means for generating a key signal in response to the excitation signal;
  control means for controlling a door in response to the key signal; and
  a door to an inhabited building for controlling access of a human under control of said control means.

27. The system as set forth in claim 26 above wherein said key means comprises means for generating the key signal without a self-contained power supply being included with said key means.

28. The key means as set forth in claim 26 above comprising means for generating the key signal without dependence on a self-contained power supply.

29. The system as set forth in claim 26 above wherein said key means generates the key signal without reliance on a self-contained power source.

30. The key means as set forth in claim 26 above comprising means for storing energy in response to the excitation signal and means for generating the key signal in response to the stored energy.

31. The key means as set forth in claim 26 above comprising rectification means for generating a rectified signal in response to the excitation signal and circuit means for generating the key signal in response to the rectified signal.

32. The system as set forth in claim 26 above wherein the excitation signal is an oscillatory signal and wherein said key means comprises means for generating an induced oscillatory signal in response to the oscillatory excitation signal, means for generating a rectified signal in response to the induced oscillatory signal, and means for generating the key signal in response to the rectified signal.

33. The system as set forth in claim 32 above wherein the oscillatory excitation signal has a first frequency characteristic, wherein the key signal is an oscillatory signal having a second frequency characteristic, wherein the first frequency characteristic is different from the second frequency characteristic, and wherein said key means includes an oscillator circuit for generating the oscillatory key signal.

* * * * *